Patented Sept. 29, 1931

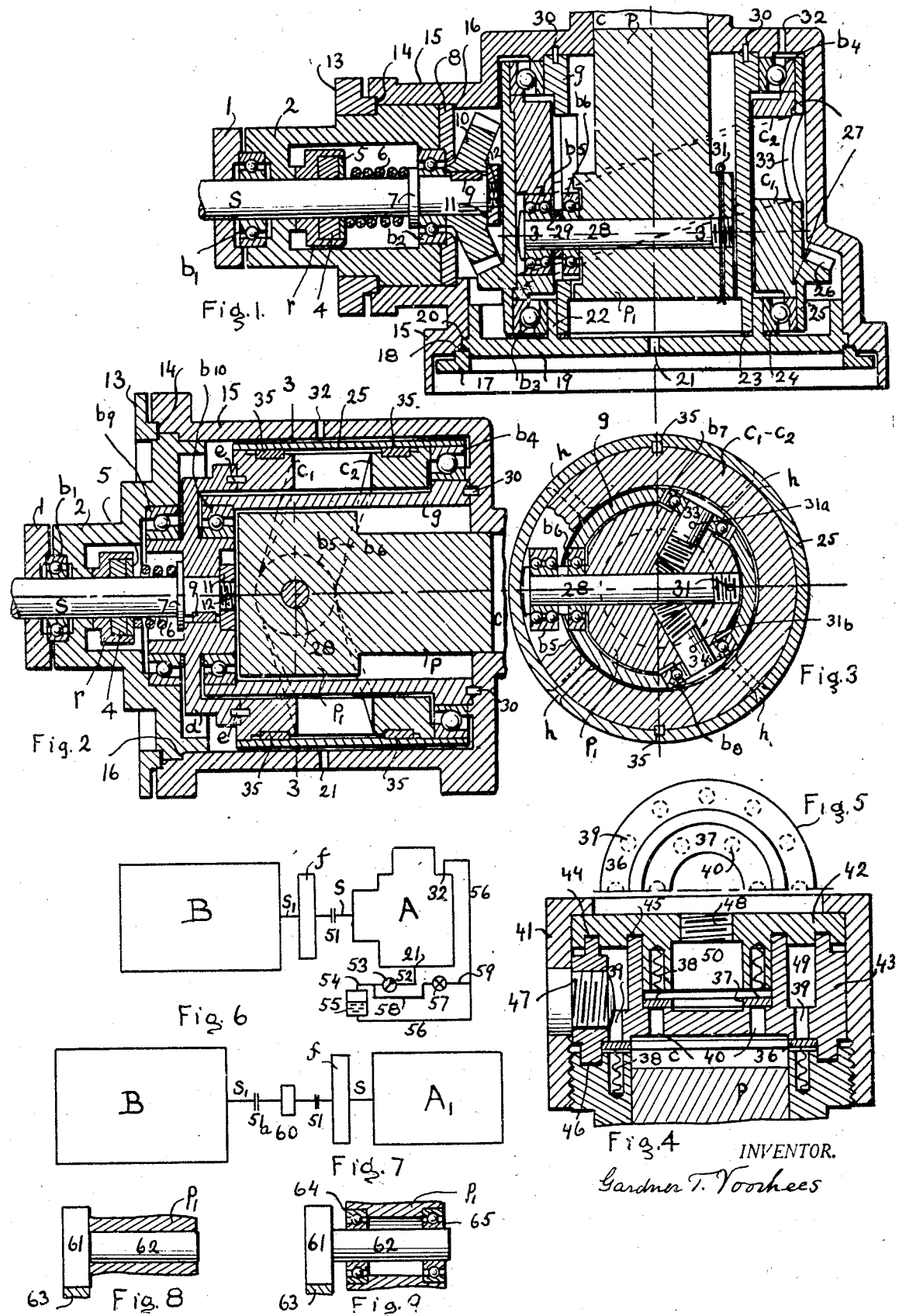

1,824,938

UNITED STATES PATENT OFFICE

GARDNER TUFTS VOORHEES, OF BOSTON, MASSACHUSETTS

PISTON PROCESS AND APPARATUS

Application filed October 25, 1926. Serial No. 144,021.

My invention relates to any apparatus employing a reciprocating piston, particularly to compressors and engines, more particularly to gas compressors and still more particularly to compressors for refrigerating systems. Its objects are, to make more compact, efficient and durable piston operation and apparatus.

The nature of the invention enables one to do away with the ordinary crank and connecting rod or the eccentric and connecting rod and has many other manifold advantages. I employ a cylindrical cam and a roller whereby circular motion is transformed into reciprocating motion and vice versa. Practically all of the rubbing surfaces are of hardened metal and have rolling action so that there is practically no wear and very little friction.

In the drawings Figs. 1 and 2 are sections through piston apparatus. Fig. 3 is a section through the central parts of Figs. 1 and 2 on lines 3, 3 of Figs. 1 and 2. Fig. 4 is a section through the top of a compressor's cylinder, Fig. 5 being a half plan view of valves with their ports, of Fig. 4. Fig. 6 is a diagrammatic elevation of a compressor embodying the construction of Fig. 1, coupled to a motor and showing an oiling system. Fig. 7 is a diagrammatic elevation of a compressor embodying the construction of Fig. 2, coupled to a motor and having external speed reducing means. Figs. 8 and 9 are modifications of a cam roller.

Similar parts generally have like numbers or letters sometimes with different subscripts.

In Fig. 1, shaft $s$ extends through ball-bearing $b_1$, held in place by collar 1 and guide 2 and is sealed by seal ring $r$, having packing 4 and ring 5 and spring 6, abutting against ring 5 and shaft collar 7, abutting against ball bearing $b_2$, held in place by ring 8. Shaft $s$ has key 9 and bevel gear 10, held in place by nut 11 and cotter pin 12. Ring 8 and guide 2 being held in place by flange 13, having gasket 14 and fitting into casing 15, having shoulder 16. Casing 15, having flange 17 and gasket 18, holding head 19 in casing 15, on shoulder 20. Head 19, having oil outlet 21 and projection 22 and adjustment washers 23, 24. 25, being a casing having bevel gear 26 and shoulders 27, containing the two halves, $c_1$ and $c_2$, of a cylindrical cam and having ball bearings $b_3$ and $b_4$. $p$ is a piston having an extension $p_1$ having pin 28 carrying ball bearing $b_5$, adapted to roll in the cylindrical cam and having collar 29 and ball bearing $b_6$ adapted to roll, up and down, in guide $g$, which is prevented from rotating by pins 30. Pin 28 being screwed into piston extension $p_1$ and having cotter pin 31. Piston $p$ reciprocating in cylinder $c$. 32 being an oil inlet and 33 being a hole in casing 25, used for assembling purposes.

Other portions of Fig. 1, not shown in that section, are shown and described with Fig. 3, there being other up and down ball bearing rollers, $b_7$ and $b_8$, engaging guide $g$ and having pins 33, 34 having cotter pins $31a$ and $31b$ screwed into piston extension $p_1$, all as shown in Fig. 3. Obviously, rotation of shaft $s$ will cause bevel gears 10 and 26 to rotate casing 25 and cam $c_1$—$c_2$ which will cause roller $b_5$ to reciprocate and thus through pin 28 reciprocate piston extension $p_1$ and so piston $p$, piston extension $p_1$ being prevented from rotating by rollers $b_6$, $b_7$, $b_8$ which roll up and down in grooves in guide $g$ which is prevented from rotating by pins 30. Conversely, reciprocation of piston $p$ in cylinder $c$ will rotate shaft $s$.

In Fig. 2 shaft $s$ extends through ball bearing $b_1$, held in place by collar 1 and guide 2 and is sealed by seal ring $r$, having packing 4 and ring 5 and spring 6, abutting against ring 5 and shaft collar 7. Shaft $s$ carrying piece $d$ having key 9 nut 11 and cotter pin 12. Guide 2 having ball bearing $b_9$, piece $d$ having pins $e$ projecting, into the $c_1$ half of cylindrical cam, whose other half is $c_2$, both halves whereof being fixed to casing 25 by keys 35. $g$ being a guide similar to that of Fig. 1, engaging ball bearing rollers similar to $b_6$, $b_7$ and $b_8$ of Figs. 1 and 3 and having ball bearing roller $b_5$ on shaft 28 in piston extension $p_1$, adapted to reciprocate piston $p$ in cylinder $c$ of housing 15, guide $g$ having pins 30 to prevent it from revolving and ball bearing support $b_{10}$. Here ball bearings $b_9$ and $b_4$ are for the cam and ball bearings. $b_1$ and $b_9$ are for the shaft, $b_9$ being common to both cam and shaft, while in Fig. 1 ball bearings $b_3$ and $b_4$ were for the cam and ball bearings $b_1$ and $b_2$ were for the shaft.

In Fig. 3, casing 25 is riveted to the two cam halves $c_1$—$c_2$ by rivets $h$ and the two cam halves are aligned by keys 35, guide $g$ having the three up and down ball bearing rollers $b_6$, $b_7$, $b_8$ having pins 33, 34, with cotter pins $31a$ and $31b$, screwed into piston projection $p_1$. Obviously rotation of shaft $s$ of Fig. 2 will reciprocate piston $p$ in cylinder $c$ and vice versa.

In Figs. 4 and 5 $c$ is a cylinder having piston $p$ and suction valve 36 and discharge valve 37 seated by springs 38 and having suction ports 39 and discharge ports 40. Cap 41 clamping pieces 42 and 43 against gaskets 44, 45, 46 and having suction inlet 47 and discharge outlet 48, thus forming suction chamber 49 and discharge chamber 50. Piston $p$ may have such a stroke as will cause it to pass above suction valve 36 so that valve 36 will surround, but not touch piston at the end of its discharge stroke. The valve mechanism of Figs. 4 and 5, or any other desired valve mechanism may be used on the ends of cylinder $c$ of Figs. 1 and 2, when the apparatus shown in Figs. 1 and 2 operates as a compressor.

In Fig. 6 A is a compressor, like Fig. 1, whose shaft $s$ has coupling 51, coupled to motor shaft $s_1$ having fly wheel $f$ thereon. B is a motor of any desired type. 52 is an oil conduit leading from outlet 21 to check valve 53 and via conduit 54 to oil reservoir 55 and via pipe 56 to oil inlet 32. 57 is a regulating valve in pipes 58 and 59 leading from pipe 54 to pipe 56. When compressor A is operated, gravity and the reciprocating action therein will cause oil and some gas to flow from outlet 21 past check valve 53 into reservoir 55 and therefrom via pipe 56 to oil inlet 32. The regulation of valve 57 will by-pass some gas and thus cause a lower gas pressure in reservoir 55 and so cause a lesser quantity of oil to be circulated. The flow of oil from 21 may be regulated by an orifice between it and receiver 55 and in place of valve 57, or both, or by an orifice between receiver 55 and inlet 32.

In Fig. 7 $A_1$ is a compressor like that of Fig. 2 whose shaft carries fly wheel $f$ coupled by coupling 51 to reducing means 60 and by coupling $51a$ to shaft $s_1$ of motor B.

In Fig. 8 61 is a roller having shaft 62 in bearing $p_1$. When said roller is pressed on surface 63 I have found that unless the ratio of diameters of 61 and 62 is sufficiently large, that roller 61 will slide on track 63 and that its shaft 62 will not revolve in its bearing $p_1$. This difficulty is not experienced by the use of ball bearings, 64, 65 as is shown in Fig. 9, but I prefer that a cylindrical cam roller shall have its ball bearings, in the roller, as in Fig. 1 rather than on the roller's shaft as in Fig. 9. As the balls and their races, the rollers and their guides, the cam and its roller, and the seal ring bearing are all hardened, there is practically no wear to these moving parts and there is very much less friction than with an ordinary compressor, for compressors of the type shown in Figs. 1, 2, and 3 and such compressors may be described as having ball bearings throughout.

What I claim is:

1. The combination of a casing, a shaft, a cylindrical cam, a cylindrical guide and a reciprocating member, the casing having an opening therein for the projection of the shaft therethrough, means to seal the shaft and casing opening against leakage therethrough, part of the shaft, the cam, guide and reciprocating member being enclosed by the casing, means to cause the shaft to rotate the cam, the cam inclosing the guide and the guide enclosing the reciprocating member, anti-friction bearings for the cam, means on one end of the guide to prevent its rotation and on its other end to center and support it, an anti-friction cam roller for the cam, carried by a projection from the reciprocating member, the guide having a groove adapted to engage an anti-friction guide roller carried by a projection from the reciprocating member, an anti-friction guide roller.

2. The combination of a casing, a shaft, a cylindrical cam, a cylindrical guide and a reciprocating member, the casing having an opening therein for the projection of the shaft therethrough, means to seal the shaft and casing opening against leakage therethrough, part of the shaft, the cam, guides and reciprocating member being enclosed by the casing, means to cause the shaft to rotate the cam, the cam enclosing the guide and the guide enclosing the reciprocating member, anti-friction bearings for the cam, means on one end of the guide to prevent its rotation and on its other end to center and support it, an anti-friction cam roller for the cam carried by a projection from the reciprocating member, the guide having a plurality of grooves adapted to engage a plurality of anti-friction guide rollers carried by projections from the reciprocating member, a plurality of anti-friction guide rollers.

3. The combination of a cylindrical cam, enclosing and spaced from a cylindrical guide enclosing and spaced from a reciprocating member, an anti-friction cam roller, a plurality of guide roller grooves in the guide, a plurality of anti-friction rollers for the guide grooves, a plurality of projections from the reciprocating member, some whereof each carrying a guide roller and one whereof carrying a guide roller and an anti-friction cam roller, means to prevent rotation of and means to support the guide.

4. The combination of a cylindrical cam, enclosing and spaced from a cylindrical guide enclosing and spaced from a reciprocating member, an anti-friction cam roller, three guide roller grooves in the guide, three anti-friction rollers for the guide grooves, three equally spaced projections from the piston's extension, two thereof each carrying a guide roller and one thereof carries a guide roller and an anti-friction cam roller, means to prevent rotation of and means to support the guide.

5. A cylindrical cam consisting of an outer casing, a shoulder near each end thereof adapted to engage a shoulder on each of two halves of a cylindrical cam fitting therein, a key way on the inside of the casing and the outside of the cam halves and a key therefor, means to fix the cam halves to the casing, the opposed ends of the halves of the cam, forming a cam groove.

6. A cylindrical cam composed of an outer casing fixed to two enclosed cam halves, said casing being provided with an opening for the constructional insertion of a cam roller and its support therethrough.

7. The combination of a cylindrical cam with an enclosed cylindrical guide enclosing a reciprocating member, supporting a cam roller support carrying a guide roller adapted to engage the cylindrical guide and a cam roller adapted to engage the cylindrical cam.

8. The combination of a casing having a shaft opening therethrough, with a shaft projecting through the opening and packing means therefor, the shaft adapted to rotate a cylindrical cam in the casing, anti-friction bearings for the shaft, a cylindrical cam provided with anti-friction bearings, an anti-friction cam roller for the cam, a non-rotatable cylindrical guide inside the cam having a guide groove and an anti-friction roller therefor, a reciprocating member inside the cylindrical guide, having a projection to carry the cam roller and the guide roller.

GARDNER T. VOORHEES.